UNITED STATES PATENT OFFICE.

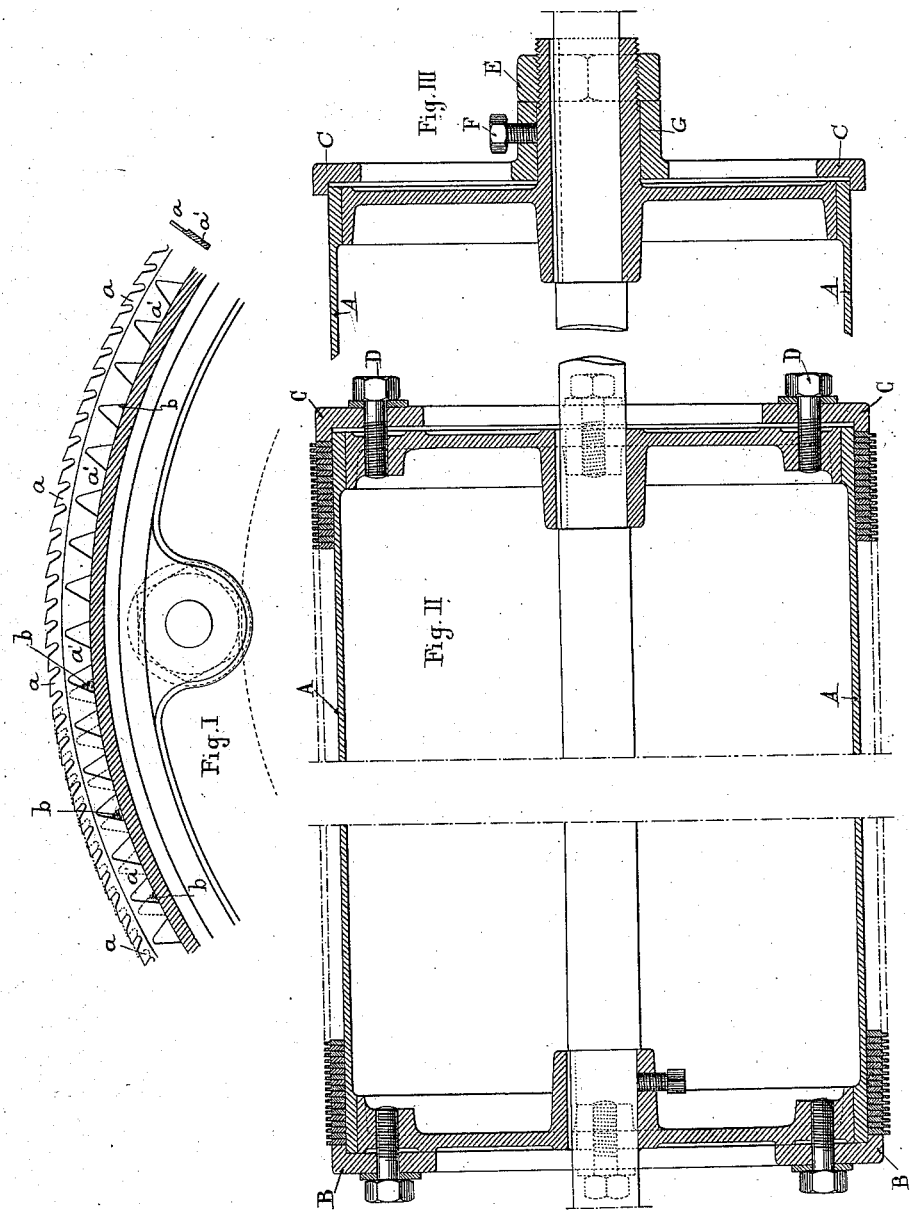

JEAN JACQUES RIEGER, OF LURE, FRANCE.

CYLINDER FOR CARDING-MACHINES, &c.

SPECIFICATION forming part of Letters Patent No. 402,616, dated May 7, 1889.

Application filed October 8, 1888. Serial No. 287,464. (No model.) Patented in France July 4, 1888, No. 191,607; in Belgium July 30, 1888, No. 88,724; in England August 2, 1888, No. 11,172; in Germany August 6, 1888, No. 48,821, and in Italy September 21, 1888, No. 24,068.

*To all whom it may concern:*

Be it known that I, JEAN JACQUES RIEGER, a citizen of the Republic of France, residing at Lure, in the said Republic, have invented certain new and useful Improvements in Cylinders for Carding-Machines, &c., (for which I have received Letters Patent in France, No. 191,607, July 4, 1888; Belgium, No. 88,724, July 30, 1888; Great Britain, No. 11,172, August 2, 1888; Germany, No. 48,821, August 6, 1888, and in Italy, No. 24,068, September 21, 1888, and for which I have filed applications for Letters Patent in Austria and Spain, which applications are dated, respectively, September 3 and September 29, 1888,) of which the following is a specification.

This invention relates more especially to these machines which are intended for working, cleaning, or tearing textile materials, and in which the cleaning or dividing organs are provided with a metallic covering known as "saw-blade," which is generally adapted to a helical groove formed on the periphery of the working-barrel throughout its length. This arrangement, in addition to its high first cost, does not allow of the blades being brought as close together as is necessary for certain operations.

This invention has for its object the construction of coverings which do not require the cutting of a groove on the surface of the drum or barrel, and which permits of the adaptation to the surface of the latter of eight or ten layers or rows of blades per centimeter. This is a great advantage in certain operations, more especially in the operation of removing burrs from wool.

The annexed drawings represent the application of the invention to the drum of a cleaning apparatus.

Figure I is a view, partly in elevation and partly in section, of the new saw-blade upon a segment of a carding-cylinder. Fig. II represents, on a reduced scale, a longitudinal section of the same cylinder furnished with its covering. Fig. III shows a modification in the method of fixing the metallic covering onto the cylinder.

The saw-blade used is provided internally and externally with teeth *a a'*, as seen in Fig. I. The internal teeth and the notches or spaces between them are wide, so that, while permitting the blade to bend freely when applied to the drum, there will be spaces left between the teeth. By leaving the teeth open after they are applied to the cylinder I am enabled to solder the windings of the blade to one another and to the drum without having any solder between the windings tending to separate them. The shape of the external teeth, *a*, will vary according to the nature of the work and the use for which the apparatus is intended. The blade is made of two thicknesses, as shown in the transverse section in Fig. I. The lower part is thicker than the upper part, and this difference in thickness, which may be as small as desired, determines the precise distance to be maintained between the working portions of the blades after they have been wound on the drum in intimate contact with each other.

In the arrangement shown in Fig. I the increased thickness of the lower part is all on one side of the blade; but it will be understood that it may also form projecting surfaces on both sides of the blade, if thought preferable. The blades are fixed on the drum in the following manner:

As may be seen on Fig. II, the outer surface of the drum A is accurately turned and provided at one end with a fixed washer, B, and at the other end with a movable washer, C, whereby the saw-blades can be pressed tightly one against the other.

After having, by means of a pin, secured one extremity of the blade to the fixed washer B, the blade is wound on the drum A, care being taken to press the coils one against the other. During this operation, the pitch of the internal teeth being immaterial and not corresponding to an exact division of the external circumference of the cylinder, the hollow parts of the tooth arrangement do not come exactly opposite each other, but overlap each other, as is shown in dotted lines on the left-hand side of Fig. 1. By this arrangement the various layers or bands of the saw-blades which are thus in juxtaposition may be connected at intervals by means of points of solder. This slight amount of solder *b* is sufficient to resist the natural elasticity of the blades while they are being wound and greatly facilitates this operation. It also permits of the employment for the covering of a cylinder of a certain number of blades placed end to end, their extremities being simply connected to each other by means of soldering. When the winding is finished, the movable washer C is placed against the end of the drum and screwed up tightly by means of screws D, arranged on it near its periphery, so that the whole of the saw-blades form one toothed cylinder extremely solid and rigid.

In the modification shown in Fig. III the movable washer C is connected by arms to a central boss, G, on which a powerful nut, E, presses. After being securely tightened up the washer is held in place by a pressure-screw, F, bearing upon the hub of the cylinder-head.

I am aware that it is old to solder the blade to the cylinder, to wind the blade spirally upon the cylinder, to provide the blade with teeth on its inner and outer edges, and to make the blade of different thicknesses, and to these features separately considered I make no claim.

I claim as my invention—

1. The combination, with the cylinder A, of the rigid washer B, projecting beyond the periphery of the cylinder, an adjustable washer, C, adapted to fit upon the opposite end of the cylinder, a spirally-wound blade wrapped about the cylinder, and screws D, adapted to draw the washer C onto the cylinder and compress the blade.

2. The combination, with the hollow cylinder A, provided with heads or spiders, of the flanged washer B, secured rigidly to one head, a similar washer, C, applied to the spider or head at the opposite end of the cylinder and flanged circumferentially to embrace the cylinder, screws D, passing through the washer C and into the head of the cylinder, and the continuous spirally-wound blade applied to the cylinder between the washers B C.

In testimony whereof I have signed my name to this specification in the presence of two subscribing witnesses.

JEAN JACQUES RIEGER.

Witnesses:
EUGÈNE DUMAS,
PHILIBERT MILLIASSON.